(12) United States Patent
Rink, Jr.

(10) Patent No.: US 6,483,211 B2
(45) Date of Patent: Nov. 19, 2002

(54) TURBINE ROTOR SUB-SLOT SCOOPS

(75) Inventor: Frederick John Rink, Jr., Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 26 days.

(21) Appl. No.: 09/728,851

(22) Filed: Dec. 1, 2000

(65) Prior Publication Data

US 2002/0067085 A1 Jun. 6, 2002

(51) Int. Cl.[7] .................. H02K 9/06; H02K 9/00; H02K 3/48
(52) U.S. Cl. .................. 310/63; 310/214; 310/59; 310/61
(58) Field of Search ................ 310/61, 63, 270, 310/59, 214

(56) References Cited

U.S. PATENT DOCUMENTS

| | | | | |
|---|---|---|---|---|
| 4,508,985 A | * | 4/1985 | Pavlik et al. | 310/270 |
| 4,546,279 A | * | 10/1985 | Hammer et al. | 310/260 |
| 4,633,116 A | * | 12/1986 | Derderian | 310/214 |
| 4,859,891 A | * | 8/1989 | Jenkins et al. | 310/215 |
| 5,894,178 A | * | 4/1999 | Stefan | 310/58 |
| 6,252,318 B1 | * | 6/2001 | Kazmierczak | 310/260 |

* cited by examiner

Primary Examiner—Karl Tamai
Assistant Examiner—Karen Addison
(74) Attorney, Agent, or Firm—Nixon & Vanderhye P.C.

(57) ABSTRACT

A rotor assembly for a turbine comprising a plurality of radially oriented, axially extending slots, each slot having a plurality of field windings seated therein; a sub-slot cover separating the windings from a base of the slot, thereby forming a coolant sub-slot radially inwardly of the windings; and an aerodynamic scoop fixed at an entrance to the sub-slot.

11 Claims, 2 Drawing Sheets

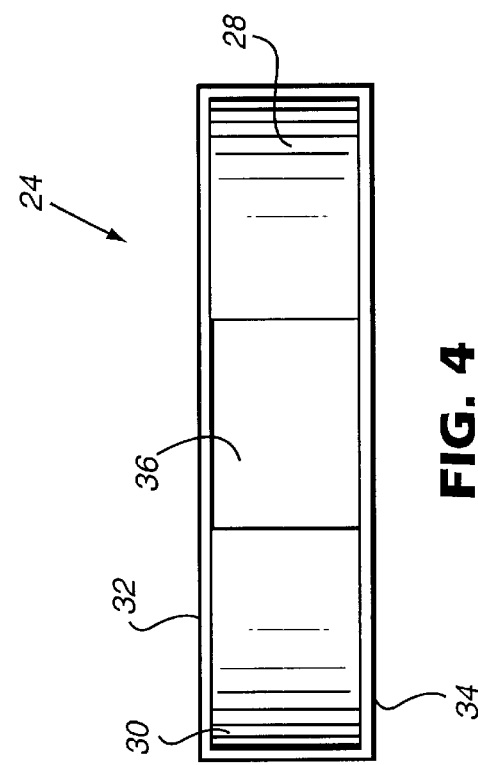
FIG. 2
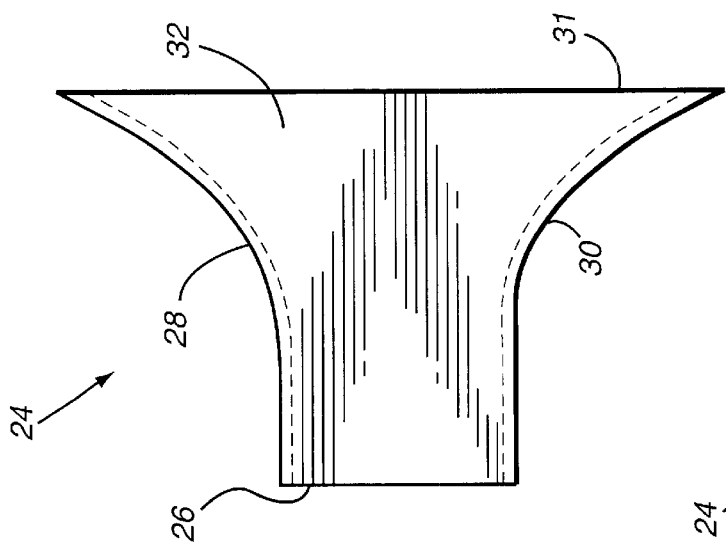
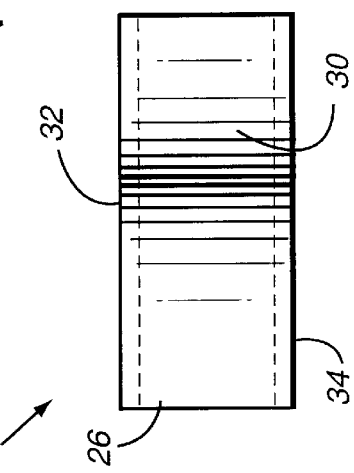
FIG. 3
FIG. 4

TURBINE ROTOR SUB-SLOT SCOOPS

This invention relates to rotor constructions in turbomachinery, and specifically, to an aerodynamic scoop for a rotor sub-slot entrance in a gas turbine rotor assembly.

BACKGROUND OF THE INVENTION

Turbine rotors are formed with an array of radial slots that extend axially along substantially the entire length of the rotor. These slots are designed to receive a plurality of copper turns, stacked one upon the other. Ventilation circuits are provided for cooling the rotor and the copper turns, and the ventilation arrangement may include a sub-slot at the base of each of the radial slots in which the copper turns are seated. An elongated cover separates the end turns from the sub-slot, allowing ventilating air to enter into the sub-slot and circulate through a plurality of passages formed in the cover and within the copper turns themselves.

It has been discovered that the largest consumer of shaft power in the rotor ventilation circuit is the loss that occurs at the rotor sub-slot entrances. Much of the loss is associated with the acceleration of the coolant flow as it enters the sub-slot, and is difficult to avoid. A large part of the loss, however, is associated with the inlet condition of the sub-slot. It has long been known that the inlet edges of the slot must be machined to provide a gradual radius. Nevertheless, the cost of machining the inlet edges is quite high, and involves many man hours of effort. In addition, variation of edge configuration from slot to slot is high. Thus, there is a need for a low cost, aerodynamically "perfect" sub-slot entrance condition.

BRIEF SUMMARY OF THE INVENTION

In accordance with an exemplary embodiment of this invention, molded plastic aerodynamic scoops are located at the rotor sub-slot entrances to provide a significantly improved aerodynamically sub-slot entrance condition. Preferably, the scoops are molded out of a material such as plastic, but other materials may also be suitable. The walls of the scoops must be very thin, however, especially if the scoops take up sub-slot space. It is expected that the improvement in inlet lost losses, however, will offset any increase in the acceleration losses due to decreased sub-slot space.

The aerodynamic scoop can be attached to the sub-slot cover to restrain against axial migration and, if desired, can be at least partially dovetailed to the sub-slot walls to provide radial restraint against centrifugal forces. Of course, the copper turns in the radial slots also provide radial restraint.

In the exemplary embodiment, side walls of the rotor sub-slot scoop in accordance with this invention flare outwardly from the sub-slot entrance in a lateral or horizontal direction (as opposed to a vertical or radial direction) such that the cooling air is funneled into the sub-slot. Top and bottom (radially outer and inner) surfaces of the scoop are preferably flat due to upper and lower interferences with copper turns and rotor spindles.

Accordingly, in its broader aspects, the present invention relates to a rotor for a turbine comprising a plurality of radially oriented, axially extending slots, each slot having a plurality of field windings seated therein; a sub-slot cover separating said windings from a base of the slot, thereby forming a coolant sub-slot radially inwardly of the windings; and an aerodynamic scoop fixed at an entrance to the sub-slot.

In another aspect, the invention relates to an aerodynamic scoop for attachment to a sub-slot in a gas turbine rotor assembly, the scoop comprising a sub-slot end having a first width substantially equal to a corresponding width of the sub-slot; a flow entrance end having a second width greater than the first width; and sidewalls curving laterally outwardly from the sub-slot end to the flow entrance end.

BRIEF DESCRIPTION OF THE DRAWINGS

FIG. 2 is a top plan view of the scoop in accordance with the invention;

FIG. 3 is a side elevation of the scoop shown in FIG. 2; and

FIG. 4 is a front elevation of the scoop shown in FIGS. 2 and 3.

DETAILED DESCRIPTION OF THE INVENTION

Figure 1:
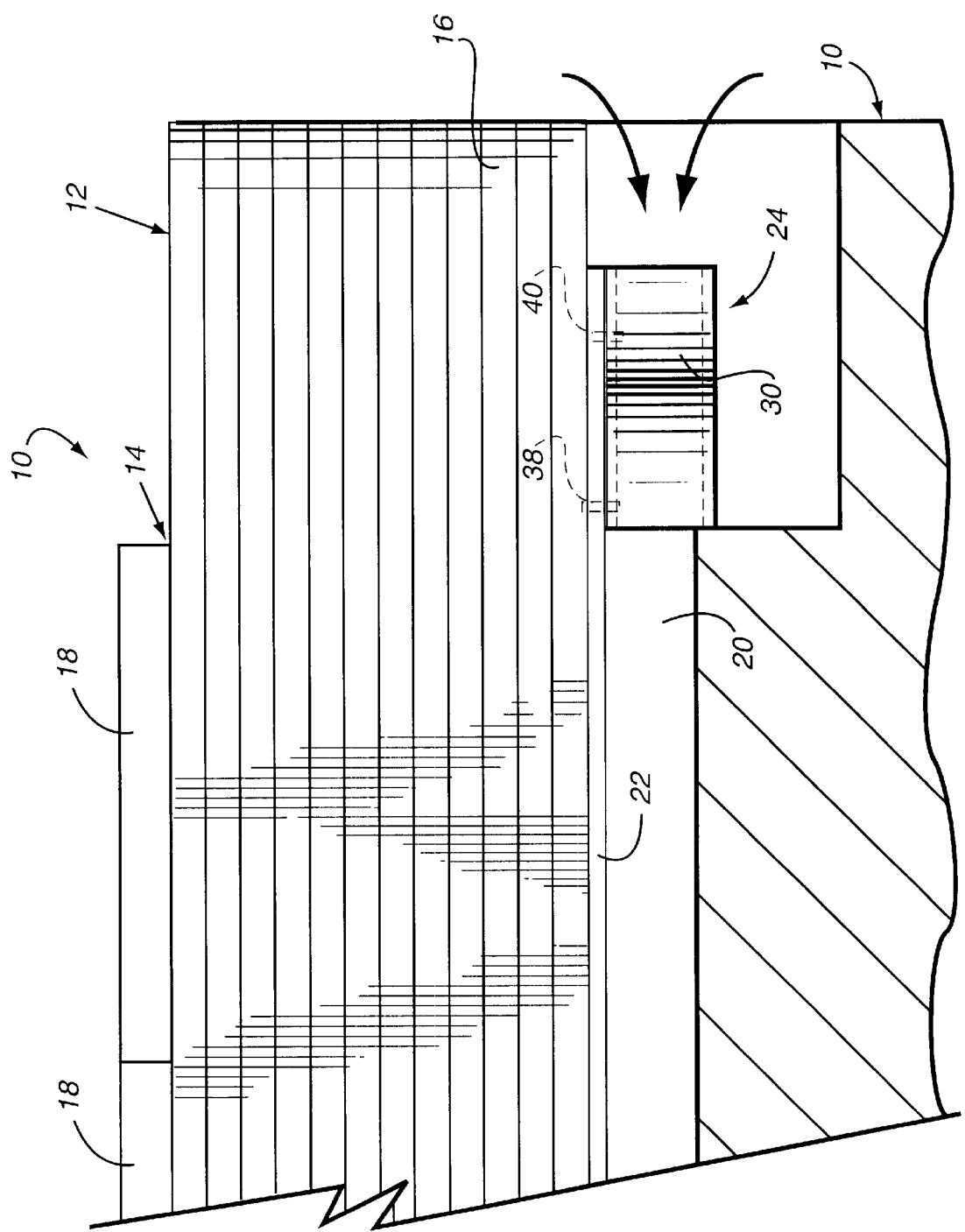
FIG. 1 is a side cross section, in partially schematic form, of a rotor slot with copper turns seated therein, and of the underlying sub-slot with the aerodynamic scoop of this invention in place.

With reference to FIG. 1, one end of a rotor assembly 10 is illustrated in partially schematic form, with a plurality of copper turns or field windings 12 seated within a radial slot 14 that extends substantially along the length of the rotor, that portion 16 of the field windings that extend beyond the rotor slot are often referred to as end windings. The rotor end windings include the end region of a number of complete coils that are formed in a concentric and generally rectangular configuration. For a two pole rotor, two such concentric sets of coils are arranged on opposite sides of the rotor. It will be appreciated that only part of one such coil is shown in FIG. 1. The windings are held within the radial slots of the rotor body by a plurality of wedge assemblies 18 only schematically shown in FIG. 1. These wedges are well known in the art and need no further discussion here.

At the base of each radial slot, a sub-slot 20 is formed with the aid of a sub-slot cover 22 that extends axially along the slot, separating the copper turns 12 from the sub-slot. The sub-slot allows cooling air to be circulated beneath and through the copper turns by means of passages formed in the cover (not shown) and in the windings themselves (also not shown).

This invention relates to the utilization of a sub-slot scoop 24 located at the entrance to the sub-slot. With further reference to FIGS. 2, 3 and 4, the sub-slot scoop includes a sub-slot end 26 that has a cross sectional shape substantially similar to the cross sectional shape of the sub-slot. The scoop side walls 28, 30 flare outwardly in opposite lateral or horizontal directions as best seen in FIG. 2 to a flow entrance end 31. The top and bottom surfaces (or radially outer and inner surfaces) 32, 34 are planar or flat. By flaring the scoop in this manner, an aerodynamic shape is imparted to the internal passage 36 of the scoop which significantly improves the sub-slot entrance condition that significantly reduces inlet losses. Further in this regard, the sub-slot scoop 24 is preferably designed to have very thin walls to minimize any increase in acceleration losses. The latter are more than offset, however, by the improvement in inlet loss reduction.

Returning to FIG. 1, the sub-slot scoop 24 is attached to the sub-slot cover 22 by any suitable means, for example, they may be glued with dowels 38, 40 to the sub-slot cover 22 and, if desired, they may also be at least partially dovetailed to the sub-slot walls. In this manner, both axial migration and radial restraint against centrifugal forces are provided.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A rotor for a turbine comprising a plurality of radially oriented, axially extending slots, each slot having a plurality of field windings seated therein; a sub-slot cover extending along said slot, separating said windings from said slot, thereby forming a coolant sub-slot radially inwardly of said windings and said sub-slot cover; and an aerodynamic scoop fixed at an entrance to said sub-slot such that a top surface of said scoop engages said sub-slot cover.

2. The rotor of claim 1 wherein said scoop is secured directly to said sub-slot cover.

3. The rotor of claim 1 wherein said scoop is comprised of plastic.

4. The rotor of claim 1 wherein said scoop includes sidewalls flaring outwardly in a direction away from the sub-slot.

5. The rotor of claim 4 wherein said top surface of said scoop and a bottom surface of said scoop are substantially flat.

6. The rotor of claim 4 wherein said scoop has a sub-slot end and a flow entrance end, said sidewalls at said sub-slot end having a width substantially equal to the width of the slot.

7. The rotor of claim 1 wherein said scoop is glued and doweled to said sub-slot cover.

8. An aerodynamic scoop for attachment to an entrance to a sub-slot in a gas turbine rotor assembly, the scoop comprising:

a sub-slot end having a first width substantially equal to a corresponding width of the sub-slot;

a flow entrance end having a second width greater than the first width; and a pair of sidewalls curving laterally outwardly from said sub-slot end to said flow entrance end;

and substantially flat top and bottom surfaces.

9. The aerodynamic scoop of claim 8 wherein said scoop is comprised of plastic.

10. The aerodynamic scoop of claim 8 in combination with an elongated planar member adapted to serve as a cover for the sub-slot.

11. The aerodynamic scoop of claim 1 wherein said scoop is glued and doweled to said cover.

* * * * *